United States Patent [19]

Etzel

[11] 4,100,065
[45] Jul. 11, 1978

[54] METHOD FOR REMOVING OF MULTIVALENT HEAVY METALS FROM METAL PLATING WASTE EFFLUENTS

[75] Inventor: James E. Etzel, Lafayette, Ind.

[73] Assignee: Purdue Research Foundation, West Lafayette, Ind.

[21] Appl. No.: 753,218

[22] Filed: Dec. 22, 1976

[51] Int. Cl.$^2$ .............................................. C02B 1/44
[52] U.S. Cl. ................................................. 210/38 B
[58] Field of Search ............................. 210/38 B, 71; 252/378 R; 75/101 BE; 423/24, 100, 139

[56] References Cited

U.S. PATENT DOCUMENTS

| 3,382,034 | 5/1968 | Kraus | 210/38 B |
| 3,658,470 | 4/1972 | Zievers et al. | 210/38 B |
| 3,758,415 | 9/1973 | Wada | 252/378 R |

*Primary Examiner*—Charles N. Hart
*Assistant Examiner*—Ivars Cintins
*Attorney, Agent, or Firm*—Biebel, French & Nauman

[57] ABSTRACT

An exfoliated vermiculite cation-exchange column is used to remove multivalent heavy metals (copper, zinc, nickel, chromium, etc.) from metal plating wastes. The exfoliated vermiculite may be either chemically or relatively low-temperature thermally expanded vermiculite ore. It preferably has a cation exchange capacity of over 80 meq/100g. Exfoliated vermiculite particle sizes of less than approximately 10 mesh are preferred as the column packing. The ion-depleted vermiculite from the exchange column after use can be further expanded thermally and used as a lightweight filling material.

9 Claims, No Drawings

METHOD FOR REMOVING OF MULTIVALENT HEAVY METALS FROM METAL PLATING WASTE EFFLUENTS

BACKGROUND OF THE INVENTION

This invention relates to a method for removing multivalent heavy metals from metal plating waste effluents and, more particularly to, the use of an exfoliated vermiculite cation-exchange column for that purpose.

Metal plating is used to improve surface properties of metallic and non-metallic products, whereby an object is coated with one or more relatively thin, tightly adherent layers of some metal or metals. The metals commonly encountered in the plating process are nickel, copper, chromium, zinc, gold, silver, cadmium and tin.

Metal coating may be applied by several different processes. Electroplating is perhaps the most common and important plating operation with respect to both prevalency and water pollution control.

One of the two basic types of metal electroplating baths is the simple salt or "acid" both. For instance, in the copper plating industry the acid plating bath consists of a copper sulfate-sulfuric acid solution with two electrodes immersed in it. These electrodes are connected to a direct current electrical source; a copper plate serves as the anode and the metal surface to be plated as the cathode. Briefly, the copper sulfate dissociates, and as a current is applied, one electrode takes on a negative charge, the other a positive charge, thus causing copper ions to migrate toward the negative electrode (cathode). Upon reaching the cathode, two electrons are accepted by the copper ion, which then becomes a copper atom and attaches itself to the cathode. At the same time the free sulfate ion moves to the positive electrode (anode); the copper atoms of the anode give up two electrons reacting with the sulfate, thus forming more copper sulfate which dissociates and allows more copper ions to pass into solution.

This plating step is the source of divalent copper metal ions in the waste water. In Buford and Mosselli, *Industrial Wastes*, Reinhold Publishing Corp. (1953) at Chapter 13 entitled "Plating Wastes" the main sources of wastes from electroplating are listed as including: (a) drag-out losses carried into the overflow rinses by the plated element or the rack holding the plated element - drag-out losses can contaminate rinse waters with copper ranging from a trace to as much as fifty times that actually plated on the work; (b) solution dumping of spent, spoiled, or obsolete solutions (this is rarely done with metallic plating baths, unless remedial measures fail); and (c) tank leakage losses.

Waste water from a copper plating operation will rarely containing copper only. Quite often other metals are plated at the same plant and the waste stream will contain two or three or more heavy metals. However, just considering the copper portion, a typical rinse water from general plating operations may contain from 0.5 to 32 ppm copper. When this is taken along with the fact that wasteflow from plating plants may vary from 1000 gallons per day to over 310,000 gallons per day, it can be seen that large amounts of copper are being dumped in the nation's waters.

Trace quantities of metals are important constituents of waters, and are necessary for the growth of biological life. The presence of metals in excessive quantity, however, hinders aquatic life and could prohibit water usage from human consumption, because of the toxic effects of the metals.

For this reason, the U.S. Public Health Service drinking water standards contain restrictions concerning the maximum permissible amounts of chemical substances allowed in water supplies. A more detailed and comprehensive listing of the toxic effects of plating wastes can be found in an Environmental Protection Agency publication entitled "Water Quality Criteria Data Book", Volume 3, Effects of Chemicals on Aquatic Life (Pub. No. 18050 GNV 05/71).

Accordingly, it can be seen that there is a need for an effective means to remove these multivalent heavy metals from plating waste effluents to avoid polluting the water supplies. Of course, this is a recognized need and numerous waste water treatment methods have been proposed.

The methods suggested for treating metal plating wastes include: dilution and discharge into sewers or streams; evaporation, dialysis and electrodialysis; reverse osmosis, and land disposal. But the two most common treatment schemes for plating wastes are: (1) neutralization - precipitation methods and (2) the ion-exchange process.

In the neutralization-precipitation methods, the two most common bases used to precipitate heavy metals as their insoluble hydroxides are calcium hydroxide and sodium hydroxide. While calcium hydroxide is the cheaper of the two materials it is more difficult and costly to feed in small amounts, so in small acid neutralization systems sodium hydroxide, inspite of its cost, is usually the material of choice.

However, heavy metal flocs are difficult to settle as they have approximately the same density as water. Accordingly, to aid settling it may be necessary to add aluminum sulfate or some other coagulant. The settled sludge can be removed to either a sludge thickener, sludge drying bed, pressure or vacuum filter or a centrifugation dewatering process, but its disposal often presents further problems.

Ion exchange resins can also be used to concentrate the ions in plating waste to facilitate their removal or may be used to concentrate and recover them for reuse in the actual plating process. The most important advantage of the ion exchange treatment system is the water saving in the plant, up to 90%, owing to water recirculation. This, then, leads to a drastic waste volume reduction.

In Von Ammon, "New Developments in the Treatment of Metal Finishing Wastes by Ion Exchange of Rinse Waters", *Purdue Univ. Ind. Waste Conf. Proc.*, 22:788 (1967) there is reported the use of ion exchange units to remove zinc, chromium, copper, nickel and silver with some being recovered for reuse, but most being removed by precipitation from the regeneration waste for disposal as a sludge. Other literature on use of ion exchange columns to remove heavy metals from plating wastes includes: Tallmage, "Ion Exchange Treatment of Mixed Electroplating Wastes", *Ind. and Engr. Process Design and Devel.*, 6:4 (1967); McGarvey, "Brass and Copper Industry," *Indus. and Engr. Chem.*, 44:534 (1952); Goddard "Ion Exchange Effluent Treatment and Wastes Product Recovery", *Process Eng.* (1975); Bloodgood, "Twenty Years of Industrial Waste Treatment," *Purdue Univ. Ind. Waste Conf. Proc.*, 20:182 (1965); and "Waste Treatment", *Upgrading Metal-Finishing Facilities to Reduce Pollution*, EPA Technology Transfer Seminar Publication, 1973.

However, in Dean, "Removing Heavy Metals from Waste Water", *Environmental Science and Technology*, 6:518 (1972), it is indicated that the industrial response to this form of waste treatment has been hindered since certain waste stream impurities are destructive to resins, interfering ions are often present, there is a limited loading capacity, and there are relatively high operating costs. Further, a major problem is that even after removal, the resultant sludge is difficult to dispose of in an acceptable manner. Accordingly, the need still exists for an efficient, low cost method of removing multivalent heavy metals from plating wastes by use of cation-exchange columns while minimizing these problems.

SUMMARY OF THE INVENTION

The present invention meets that need by providing a low cost, efficient means for treating such waste effluents by use of an exfoliated vermiculite cation-exchange column.

Exfoliated vermiculite is vermiculite ore which has been expanded either chemically or thermally to separate the aluminosilicate platelets of the vermiculite structure. That is, as first set forth by Gruner in "Vermiculite and Hydrobiotitic Structures", *Am. Mineralogist*, 24:428 (1939) vermiculite has a structure consisting of two tetrahedral sheets, with a central trioctahedral layer. These groups of mineral sheets are separated by layers of water molecules occupying a definite space.

Magnesium ions are associated with the water molecules. These magnesium ions are largely exchangeable and their function is to satisfy a charge deficiency in the mineral layers. Thus, vermiculite consists of mica layers between which are located sheets of hydrated magnesium ions.

When vermiculite is placed in a hot furnace (approximately 300°–600° C) so as to heat abruptly, the water of hydration associated with the exchangeable cations is converted to steam. As a result, the mineral exfoliates, that is, the aluminosilicate platelets are separated by expansion of the steam. High temperature thermal expansion (such as the known process utilizing temperatures of around 2000° C), on the other hand, causes loss in ion exchange capacity due to the fixation of the cation on the basal surface.

Thermal exfoliation at lower temperatures (preferably 550° C) is alone sufficient to rupture the chemical bonds which hold the platelets together. While some of the mobile exchangeable cations become "fixed" to the surface, the ion exchange capacity is not destroyed. Rather, ion-exchange is facilitated since exfoliation in this manner provides more surface area of the mineral sheets, more readily. Cation exchange, being a surface reaction, proceeds as fast as ions from the solution can be supplied to the exchange surface. Low temperature thermal exfoliation can be used to provide this increased surface area.

Vermiculite can also be exfoliated chemically without the use of excessive temperature. Simple cation exchange of the exchangeable divalent cation with monovalent cations followed by hydration with $H_2O$ will readily separate the platelets. Chemical exfoliation can be done with NaCl, LiCl, $H_2O_2$ and $H_2SO_4$. The exfoliation is caused by the hydration of the sodium, lithium or sulfuric acid. The hydrogen peroxide induced expansion is a result of a catalytic decomposition of the $H_2O_2$ which causes the vermiculite platelets to separate. On chemical exfoliation, palatelet size and integrity is retained, maximum surface area is developed, and furthermore there is no "fixation" of the exchangeable ions to the silicate layer.

Both chemical and lower temperature thermal exfoliation of vermiculite are known processes. See, for example, *Chemical Exfoliated Vermiculite for Removal of Phosphate from Wastewaters*, U.S. Dept. of the Interior, Federal Water Quality Adm., Water Pollution Control Research Series, #17010 DHK (1969). As mentioned, exfoliation in this manner results in providing more surface area of the mineral sheets without destruction of the ion exchange capacity. For the purposes of the present process a cation-exchange capacity, as hereinafter defined, of at least approximately 80 meq/100g is desired.

With such an ion-exchange capacity, the vermiculite has sufficient surface ions available for the following reaction which can be assumed to take place between the mineral and the metal solutions:

$$RMg + M^x \rightarrow RM + Mg^{++}$$

In this equation R is the non-mobile species of the vermiculite lattice, Mg is the desirable exchangeable species associated with the vermiculite, and $M^x$ is the undersirable ion in the plating waste effluent which is to be removed. The $M^x$ ion may be any of those multivalent heavy metal ions found in metal plating waste effluents, thus, $x$ is typically $++$ or $+++$, but could be more. The ions of more than one metal may be found in some waste effluents to be treated.

Accordingly, it is an object of the present invention to provide a method for removing multivalent heavy metal ions from metal plating waste effluents by using an exfoliated vermiculite cation-exchange column.

Other objects and advantages of the invention will be apparent from the following description and the appended claims.

DESCRIPTION OF THE PREFERRED EMBODIMENTS

Cation-exchange in clay minerals is a reversible process, and the stoichiometry of the reaction helps differentiate between ion-exchange and simple sorption. This distinction, however, is sometimes difficult to apply since nearly every ion-exchange process is accompanied by sorption or desorption.

Accordingly, the term "cation-exchange capacity" (abbreviated "CEC") will be used to indicate the degree to which exchange cations are held by exfoliated vermiculite. Cation-exchange capacity is normally defined as the sum of the exchangeable cations of a material. Cation-exchange capacity is usually expressed in terms of milliequivalents of exchange capacity per 100 grams of material (meq/100g). Exchange capacity is determined at neutrality, that is pH 7. There are varied methods available for determining the CEC of clay minerals, although most procedures consist of the same three basic steps:

(1) The clay mineral sample is saturated with the chosen cation by either leaching, or repeated washing and centrifuging.

(2) The excess saturation solution is then removed from the clay by repeated washing with water or alcohol.

(3) The absorbed cation is then displaced and the amount of displaced cation measured as the indication of exchangeable cation in the clay mineral sample.

The cation-exchange capacities were determined for two preferred exfoliated vermiculites. One was a thermally expanded vermiculite. Thermal expansion was accomplished by heating dry ground ore obtained from Transvaal, South Africa in a 550° C oven for one hour and forty minutes. Expansion was 135 percent.

The other was a chemically expanded vermiculite. Chemical expansion was accomplished by placing 30g of dry ground ore in a 2 liter glass container. Then 600ml of deionized water was added plus 200ml of 30% $H_2O_2$. The glass container was covered and heated over a steam bath ($\simeq$ 80° C) for 22 hours. Then the $H_2O_2$ solution was decanted and the vermiculite was washed with deionized water until filitrate was negative to a $KMnO_4$ test. The vermiculite was then left to stand in deionized water for 18 hours, after which it was filtered and dried at $\simeq$ 50° C temperature for 24 hours. Expansion was 200%.

The cation-exchange capacities for these two types of exfoliated vermiculites were determined by a column test at varying inflow concentrations. The column CEC decreased as the concentration increased, but in each case the CEC was over 80meq/100g. The cation-exchange capacities were:

| Column Inflow (mg/l of $Cu^{++}$) | Cation-Exchange Capacity | |
| --- | --- | --- |
| | Chemically Expanded | Thermally Expanded |
| 5 | 143 | 151 |
| 50 | 101 | 90 |
| 100 | 89 | 81 |

Of course, other thermal and chemical methods of exfoliating the vermiculite may be used. It is only essential that the CEC be not destroyed by the exfoliating process so that a CEC of at least approximately 80 meq/100g (by the column test procedure above) be obtained. For ease of handling and simplicity, heating in an approximately 550° C oven is preferred, however.

While the particle sizes usable may vary widely, the smaller exfoliated vermiculite particles have been found preferable for use in a cation-exchange column. The reason for this is that the small particle size does not adversely affect the CEC, the rate of ion exchange is increased with a decrease in particle size, channelization and air pockets in the column are minimized by use of the smaller particles and the smaller particles were more easily packed in the laboratory size column. Therefore, at least in regard to the laboratory experiments set forth in the examples, preferred are verm. $\leq$10 mesh (i.e., $\leq$1200$\mu$) particles. Of course, in commercial columns, the preferred particle size may differ.

The other process parameters may also vary depending on the type of heavy metal ion being removed, the concentration in the waste effluent, the amount of effluent to be treated, etc. However, on a laboratory scale the following optimums have been determined to exist:
 (a) Exfoliated vermiculite bed height: 12-13 inches
 (b) Column surface: 0.11 in$^2$
 (c) Bed volume: 28ml
 (d) Particle size: $\leq$10 mesh
 (e) Hydraulic flow rate: 2ml/min. (0.7 gal/min/ft$^2$)
 (f) Direction of flow: upflow
 (g) Hydraulic detection time: 14 minutes Scaling-up to commercial size, within these general guide-lines and relationships, can be easily accomplished by one of ordinary skill in the art.

In any event, once passed through the column, the waste effluent is relatively free of multivalent heavy metal ions. Still, since the column has a limited ion-exchange capacity, at some point the exchangeable ions are exhausted. This may be termed the exhaustion point. An earlier reached point is when the columns are no longer efficient, even though not completely exhausted. This is termed the breakthrough point. It may be determined by monitoring the output of the column (watching for a surge in heavy metal ion concentration) or by quantitively preparing breakthrough-exhaustion curves for a given size column.

However, once the exhaustion point has been reached, the exfoliated vermiculite particles must either by regenerated with regard to cation-exchange capacity or replaced. For practical purposes, the breakthrough point may serve as the point of regeneration since efficiency is lost after that point has been passed. Because vermiculite is relatively inexpensive, it is easiest to merely dispose of the ion-depleted vermiculite particles.

It has been discovered that an interesting alternative is to further expand ion-depleted vermiculite by placing in a very hot oven (over 700° C). The material produced in this manner has the same appearance, bulk and structure as the commercially sold expanded vermiculite.

Vermiculite ore heated at high temperatures expand to many times its original volume, making a very light material. Expanded vermiculite is used extensively as an insulation material in construction; it can be used either as a loose filling or molded into slabs. Also, the expanded mineral is used widely as packaging material to prevent breakage. The third wide usage of exfoliated vermiculite is in the area of gardening. Mixing with soil when planting shrubs, bulbs, flowers, vegetables, etc., vermiculite is ideal to keep the soil loose and loamy, moist and fresh. Horticulturists also use it as a medium for rooting cuttings, as well as a starting compound for seedlings. Its use is increasing in all three areas.

Accordingly, the ion-depleted vermiculite remaining after the process of the present invention may be used in this manner. It may also be regenerated in known ways, but this is not as economically attractive as mere disposal or use as lightweight material in the above manner.

DESCRIPTION OF THE PREFERRED EMBODIMENTS

EXAMPLE I

In this example, four different copper concentrations were tested in two sets of vermiculite columns. One set of four columns utilized vermiculite exfoliated chemically with $H_2O_2$ as previously described. The other set of four utilized vermiculite exfoliated in a 550° C oven as previously described. In each instance the particle sizes used were $\leq$10 mesh.

The eight columns were otherwise identical in setup. All had an exfoliated vermiculite bed height of 12-13 inches, a column surface of 0.11 in$^2$, a bed volume of 28ml, a vermiculite weight of 12 grams, a hydraulic flow rate of 2ml/min in an upflow direction, and a detention time of fourteen minutes.

In runs 1-4, utilizing the chemically exfoliated vermiculite, a copper ion concentration was applied at 100, 50, 25, and 5mq/l, respectively. Runs 5-8, utilizing the thermally exfoliated vermiculite, also had 100, 50, 25 and 5mg/l of copper applied to them. In regard to each of the eight columns, cumulative totals of the copper ion applied (mg) were kept, the effluent collected and tested, and cummulative totals of the copper ion found in the effluent (mg/l) also recorded.

Copper determinations in the effluent samples as well as in the feed solutions were performed using the Hach DC-DR (direct reading) Colorimeter, of the Hach Chemical Company, Ames, Iowa. The Bicinchoniate Method, with CuVer 1 Copper Reagent Powder Pillows was used, according to the manual provided by the company.

Using this cumulative data, breakthrough-exhaustion curves were prepared for each run. From the breakthrough-exhaustion curve it is possible to estimate the quantity of ions removed. This is given in Table I, below. Table I also shows the total copper applied to each column and the total column capacity at the exhaustion point. In addition, Table I gives the cation-exchange capacities of the vermiculite, as they were determined for each column, based on the bed exhaustion data; it also shows the total percent copper removal obtained by each column.

TABLE I

COLUMN VALUES AT EXHAUSTION STAGE

| Column No. | Total $Cu^{++}$ Applied (mg) | Column Capacity (Total $Cu^{++}$ absorbed) | | Vermiculite C.E.C. (meq/100 g) | % $Cu^{++}$ Removal |
| --- | --- | --- | --- | --- | --- |
| | | (mg/column) | (meq/column) | | |
| 1 | 1100 | 341 | 10.6 | 89 | 31 |
| 2 | 850 | 387.5 | 12.1 | 101 | 45 |
| 3 | 425 | 302.5 | 9.5 | 79 | 71 |
| 4 | 990 | 549 | 17.1 | 143 | 55 |
| 5 | 1100 | 311 | 9.7 | 81 | 28 |
| 6 | 850 | 346.5 | 10.8 | 90 | 41 |
| 7 | 425 | 278.5 | 8.7 | 73 | 66 |
| 8 | 990 | 580 | 18.1 | 151 | 59 |

It should be noted that the arbitrary chosen exhaustion value of 0.95 $C_x$, where $C_x$ was the inflow copper concentration, was not always reached due to mechanical difficulties (pump malfunctioning, etc.); columns 3 and 7 were stopped at only 0.73 $C_x$ and 0.72 $C_x$ valued, respectively. This is probably the explanation for the abnormally low column capacities shown in these two runs.

Table II, below, gives the percent bed utilizations determined at the arbitrarily chosen breakthrough point of 0.1mg/l. The percent bed utilization was calculated using the cumulative flow through the column at 0.1 mg/l effluent copper concentration, and the following formula % Bed Utilization =
$$\frac{(\text{Volume at 0.1 (mg/l)}) (\text{mg/l}) Cu^{++} \text{ in Feed}}{(\text{Bed capacity (From Table I), mg})} \times 100$$

TABLE II

PERCENT BED UTILIZATIONS AT 0.1 mg/l COPPER BREAKTHROUGH VALUE

| Column No. | Influent $Cu^{++}$ concentration (mg/l) | Cumulative Volume at 0.1 mg/l (l) | Total $Cu^{++}$ Applied (meq) | % Bed Utilization |
| --- | --- | --- | --- | --- |
| 1 | 100 | 0.250 | 0.78 | 7.3 |
| 2 | 50 | 0.305 | 0.48 | 4 |
| 3 | 25 | 3.060 | 2.39 | 25.3 |
| 4 | 5 | 34.750 | 5.43 | 32 |
| 5 | 100 | 0.265 | 0.83 | 8.5 |
| 6 | 50 | 1.010 | 1.58 | 14.6 |
| 7 | 25 | 3.070 | 2.40 | 27.5 |
| 8 | 5 | 31.250 | 4.88 | 27 |

As can be seen from Tables I and II, the cation-exchange capacities and percent bed utilization increased as the influent copper concentration was decreased. Accordingly, a Table III was prepared to determine how many bed volumes of copper solution are used in each run before break-through occurred at 0.1 mg/l copper.

TABLE III

NUMBER OF BED VOLUMES OF COPPER SOLUTION USED, BEFORE BREAK-) THROUGH AT 0.1 mg/l COPPER

| Column No. | Number of Bed Volumes |
| --- | --- |
| 1 | 9 |
| 2 | 11 |
| 3 | 109 |
| 4 | 1241 |
| 5 | 9.5 |
| 6 | 36 |
| 7 | 109.5 |
| 8 | 1116 |

This illustrates that the number of bed volumes passed through, increased dramatically as the feed concentration of the copper decreased. Accordingly, it would appear that when using a smaller column such as the laboratory column used in this example, the treatment should be of waste effluents having lower copper concentrations (25mg/l or less). Otherwise, it would be totally impractical since the vermiculite would have to be replaced rather frequently in order to accommodate the high copper concentration waste effluents. Obviously, larger columns containing more vermiculite and having a higher total column cation-exchange capacity would be needed for the higher concentration wastes; although such high concentrations are rare.

Finally, the vermiculite from the spent ion-exchange columns was placed in a 700°-800° C oven. The material produced seemed to have the same appearance, bulk and exfoliated structure as the commercially sold vermiculite.

Summarizing the results in Tables I–III, it can be seen that the two types of exfoliated vermiculite demonstrated similar copper removal capacities, at all four inflow concentrations. The total cation-exchange capacity of the vermiculite increased as the copper concentration in the influent to the columns decreased; the cation-exchange capacity values ranged from 81 to 151 meq/100 g, for 100mg/l to 5 mg/l copper feed concentrations, respectively. The influent copper concentration also affected the percent bed utilization and the number of bed volumes passed through the vermiculite column, prior to a 0.1 mg/l copper breakthrough point. Percent bed utilization values ranged from 7.3 to 32, and the number of bed volumes ranged from 9 to 1241, for copper concentrations of 100 to 5 mg/l, accordingly, in the feed. The total copper removal, at bed exhaustion, varied from 28 percent for 100 mg/l copper inflow, to 59 percent, for 5 mg/l copper influent concentration.

EXAMPLE II

Utilizing the same column arrangement described in Example I, a solution containing a mixture of 3 mg/l copper, 3 mg/l zinc and 3 mg/l nickel was passed through the column to determine effectiveness of zinc, copper and nickel removal. The hydraulic loading rate was adjusted to 0.7 gallons per minute per square foot (2 ml/min) in an upflow direction and the effluent from the column analyzed for the metals by atomic absorption spectrophotometry. The vermiculite used was thermally exfoliated and had a particle size of $\leq 10$ mesh. Table IV gives the results for each ion at various levels of cumulative liters of effluent collected.

TABLE IV

| Liters of Effluent (Cumulative) | Metal Concentration in Effluent (mg/l) | | |
|---|---|---|---|
| | Cu | Zn | Ni |
| 5 | 0 | 0 | 0 |
| 10 | 0.03 | 0.03 | 0.03 |
| 12 | 0.05 | 0.05 | 0.05 |
| 15 | 0.075 | 0.125 | 0.075 |
| 18 | 0.04 | 0.175 | 0.04 |
| 21 | 0.125 | 0.725 | 0.075 |
| 24 | 0.15 | 2.10 | 0.10 |
| 27 | 0.4 | 0.80 | 0.4 |
| 31 | 1.2 | 1.5 | 0.7 |
| 35 | 2.2 | 2.3 | 0.95 |
| 38 | 1.95 | 2.4 | 1.1 |

From these examples, it can be seen that exfoliated vermiculite is effective in removing multivalent heavy metals from solutions passed through the laboratory-size column, particularly at metal concentrations of 25 mg/l or less. On a commercial scale, it is believed that plating wastes having even greater concentrations of multivalent heavy metals can be treated efficiently and effectively utilizing an exfoliated vermiculite cation-exchange column.

While the method herein described constitutes a preferred embodiment of the invention, it is to be understood that the invention is not limited to this precise method, and that changes may be made therein without departing from the scope of the invention which is defined in the appended claims.

What is claimed is:

1. A method for removing multivalent heavy metal ions from metal plating waste effluents to avoid polluting the water supplies comprising passing a metal plating waste effluent having a multivalent heavy metal ion concentration of 25 mg/l or less through a cation-exchange column packed with exfoliated vermiculite particles, whereby the multivalent heavy metal ions are exchanged for a non-polluting magnesium ion and the heavy metal ions are retained by the vermiculite lattice so as to prevent polluting the water supplies with the discharged metal plating waste effluent.

2. The method of claim 1 wherein said exfoliated vermiculite particles have a cation-exchange capacity of over 80 mg/100g.

3. The method of claim 2 wherein said exfoliated vermiculite particles are less than approximately 10 mesh in size.

4. The method of claim 3 wherein said exfoliated vermiculite particles are ones which have been thermally expanded by heat treatment at approximately 550° C.

5. The method of claim 3 wherein said exfoliated vermiculite particles are ones which have been chemically expanded by treatment with hydrogen peroxide.

6. The method of claim 3 wherein said multivalent heavy metal ions are ions of metals selected from the group consisting of copper, zinc and nickel.

7. The metal of claim 6, wherein said effluent is passed through said column at 0.7 gal/min/ft$^2$ or less.

8. The method of claim 3 wherein said effluent has a copper ion concentration of 25 mg/l or less.

9. The method of claim 1 wherein said exfoliated vermiculite is, after completion of the ion-exchange process, removed from said column and heated to over 700° C to expand it and produce a lightweight expanded vermiculite material.

* * * * *

UNITED STATES PATENT AND TRADEMARK OFFICE
CERTIFICATE OF CORRECTION

PATENT NO. : 4,100,065
DATED : July 11, 1978
INVENTOR(S) : James E. Etzel

It is certified that error appears in the above–identified patent and that said Letters Patent are hereby corrected as shown below:

In the title, "removing" should be --removal--.
Col. 1, line 9, comma should be before "to".
Col. 1, line 22, "both" should be --bath--.
Col. 3, line 67 "palatelet" should be --platelet--.
Col. 4, line 66, "absorbed" should be --adsorbed--.
Col. 6, line 33 "Mixing" should be --Mixed--.
Col. 6, line 65, "5mq/1" should be --5mg/l--.

Col. 10, Claim 2, line 17, "80 mg/100g" should be
   --80 meq/100g--.

Signed and Sealed this

Sixteenth Day of January 1979

[SEAL]

Attest:

RUTH C. MASON
Attesting Officer

DONALD W. BANNER
Commissioner of Patents and Trademarks